(12) United States Patent
Webb et al.

(10) Patent No.: US 8,074,802 B2
(45) Date of Patent: Dec. 13, 2011

(54) APPARATUS FOR PROTECTION OF MICROARRAYS FROM OXIDATIVE DEGRADATION

(75) Inventors: Peter G. Webb, Menlo Park, CA (US); Alan Schenck, Sunnyvale, CA (US); Robert E. Woodworth, Sunnyvale, CA (US); Emily Marine Leproust, San Jose, CA (US); Eric Lin, Santa Clara, CA (US); Jeffrey M. McMillan, Morgan Hill, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 50 days.

(21) Appl. No.: 12/492,885

(22) Filed: Jun. 26, 2009

(65) Prior Publication Data
US 2010/0326862 A1 Dec. 30, 2010

(51) Int. Cl.
*B65D 85/48* (2006.01)
(52) U.S. Cl. .................................... 206/456; 206/455
(58) Field of Classification Search .................. 206/455, 206/456, 477, 478, 722, 723, 714, 725, 804
See application file for complete search history.

(56) References Cited

U.S. PATENT DOCUMENTS

| 3,701,456 | A | * | 10/1972 | Alroy et al. | 206/520 |
| 4,796,411 | A | * | 1/1989 | Kimura et al. | 53/453 |
| 5,044,500 | A | * | 9/1991 | Webber et al. | 206/456 |
| 5,090,568 | A | * | 2/1992 | Tse | 206/456 |
| 5,147,042 | A | * | 9/1992 | Levy | 206/456 |
| 5,310,076 | A | * | 5/1994 | Burton et al. | 220/377 |
| 6,161,690 | A | * | 12/2000 | Isozaki | 206/308.1 |
| 6,863,179 | B2 | * | 3/2005 | Leykin et al. | 206/565 |
| 6,864,097 | B1 | * | 3/2005 | Schembri et al. | 436/165 |
| 7,125,523 | B2 | * | 10/2006 | Sillman | 422/104 |
| 7,410,055 | B2 | * | 8/2008 | Plank | 206/456 |
| 2004/0086868 | A1 | | 5/2004 | Parker et al. | |
| 2004/0101870 | A1 | * | 5/2004 | Caubet et al. | 435/6 |
| 2007/0105125 | A1 | | 5/2007 | Tsai et al. | |

OTHER PUBLICATIONS

Agilent Ozone-Barrier Slide Cover User Guide. Agilent Technologies, Inc. Feb. 2009.

* cited by examiner

*Primary Examiner* — David Fidei

(57) ABSTRACT

A slide cover for enclosing a region comprising an active region on a slide is provided. A slide cover and a slide are also provided. A slide cover for enclosing a region comprising an active region on a slide, where the slide is placed in a clamshell slide holder is also provided.

17 Claims, 4 Drawing Sheets

APPARATUS FOR PROTECTION OF MICROARRAYS FROM OXIDATIVE DEGRADATION

INTRODUCTION

Biopolymer arrays (such as DNA or RNA arrays) are used, for example, as diagnostic or screening tools. Such arrays include regions of usually different sequence polynucleotides arranged in a predetermined configuration on a substrate. In use, the arrays, when exposed to a sample, will exhibit an observed binding or hybridization pattern. This binding pattern can be detected upon interrogating the array. For example, all polynucleotide targets (for example, DNA) in the sample can be labeled with a suitable label (such as a fluorescent dye), and the fluorescence pattern on the array accurately observed following exposure to the sample to detect the presence and/or concentration of one or more polynucleotide components of the sample.

Biopolymer arrays have previously been provided in two formats. In one format, the array is provided as part of a package in which the array itself is disposed on a first side of a glass or other transparent substrate. This substrate is fixed (such as by adhesive) to a housing with the array facing the interior of a chamber formed between the substrate and housing. An inlet and outlet may be provided to introduce and remove sample and wash liquids to and from the chamber during use of the array. The entire package may then be inserted into a laser scanner, and the sample exposed array may be read through a second side of the substrate.

In another format, the array is present on an unmounted glass or other transparent slide substrate. This array is then exposed to a sample optionally using a temporary housing to form a chamber with the array substrate. The slide is the placed in a slide holder and inserted into a scanner. In some cases the slide is directly inserted into the scanner.

SUMMARY

A slide cover is provided. In certain cases, the subject slide cover has a top surface that contains a first raised area for applying pressure to the slide cover, and a bottom surface containing (a) a substantially planar area; and (b) a sealing element, wherein the slide cover is adapted to engage with a slide containing an active region to produce a cavity defined by the substantially planar area, the sealing element and a region of the slide that contains the active region, wherein pressure upon the first raised area pushes the sealing element upon the slide to form a reversible seal that encloses the active region of the slide and forms a barrier to air circulation between the interior and exterior of the cavity.

In exemplary embodiments, the substantially planar area of the bottom surface of the slide cover is optically inert and is spaced from the active region of the slide in the cavity. In other embodiments, the entire slide cover may be optically inert.

In some embodiments, the sealing element contains a wall that is perpendicular to the plane of the bottom surface and has a height of about 1-3 mm. In certain embodiments, the sealing element may be located at the periphery of the slide cover and contains a flange that contacts the slide. In certain embodiments the flange is discontinuous along the periphery of the slide cover and allows elements from a slide holder into which the slide cover and slide maybe placed to contact the slide. In certain embodiments, the flange extends to the periphery of the slide.

In some embodiments, the slide cover may be a single piece of plastic, e.g., an injection molded or a vacuum-formed piece of plastic. In other embodiments, the slide cover is made of a plastic material selected from a group consisting of polypropylene, polystyrene, polyvinyl chloride, acrylonitrile butadiene styrene, styrene butadiene copolymers, and polyethylene terephthalate.

In some embodiments, the reversible seal formed between the sealing element and the slide does not contain an adhesive. In some cases, the top surface contains a second, a third and a fourth raised area. In exemplary embodiments, the slide cover may have the same dimensions as the slide. In some embodiments, the slide cover comprises a locating tab for holding the slide cover and positioning the slide cover over the slide.

In particular embodiments, the active region contains a chemical array with fluorescent dye bound thereto and the reversible seal protects the fluorescent dye from ozone-mediated degradation.

A clamshell holder comprising the above mentioned slide cover is also provided. In some embodiments, the clamshell holder contains (a) a base for mounting and holding a slide, the slide containing an active region; (b) a lid mounted on the base for closing the clamshell slide holder and securing the slide in a fixed position; and (c) a slide cover containing: a top surface comprising a first raised area for applying pressure to the slide cover; and a bottom surface comprising: (i) a substantially planar area; and (ii) a sealing element; wherein the slide cover is adapted to engage with the slide to produce a cavity defined by the substantially planar area, the sealing element and a region of the slide that comprises the active region, wherein pressure upon the first raised area pushes the sealing element upon the slide to form a reversible seal that encloses the active region of the slide and forms a barrier to air circulation between the interior and exterior of the cavity. In some embodiments, slide cover is attached to the lid, while in other cases, the slide cover is a separate piece that is not attached to the lid. In some embodiments, the base and lid are joined at one end by a hinge, and closure of the lid exerts pressure upon the first raised area, thereby forming the reversible seal.

A method for using the slide cover is also described. The method comprises placing a slide into the base of a clamshell slide holder as describe above with the active area facing the lid when the lid is closed; placing the slide cover on the slide with the bottom surface facing the slide; closing the lid, thereby exerting pressure upon the first raised area and forming a cavity that contains the active region; and scanning the active area through the bottom region of the slide. The method may further include saving data obtained from the scanning. In certain examples, the method may further include opening the clamshell slide holder, removing the slide cover, and re-using the slide cover for scanning of an active area on a different slide.

DEFINITIONS

Figure 1:
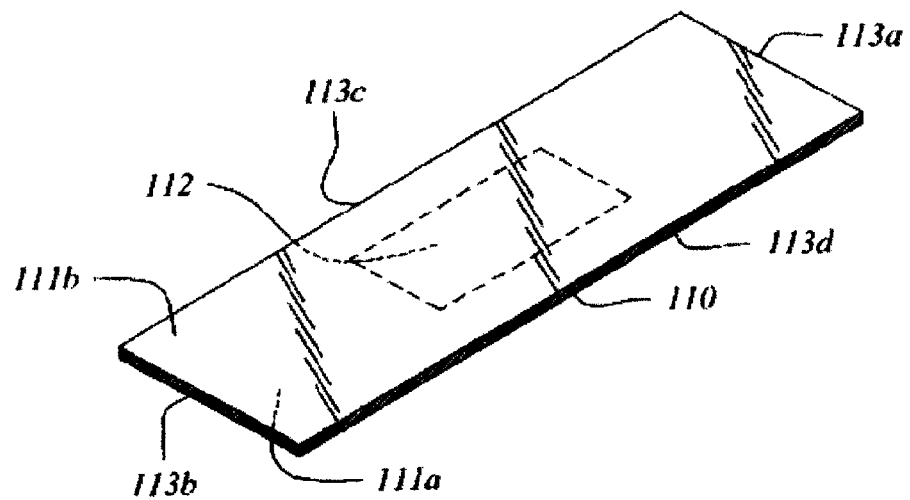
FIG. 1 illustrates a slide carrying an array.

The term "sample" as used herein relates to a material or mixture of materials, typically, although not necessarily, in liquid form, containing one or more analytes of interest.

The term "nucleotide" is intended to include those moieties that contain not only the known purine and pyrimidine bases, but also other heterocyclic bases that have been modified. Such modifications include methylated purines or pyrimidines, acylated purines or pyrimidines, alkylated riboses or other heterocycles. In addition, the term "nucleotide" includes those moieties that contain hapten or fluorescent labels and may contain not only conventional ribose and deoxyribose sugars, but other sugars as well. Modified nucleosides or nucleotides also include modifications on the sugar moiety, e.g., wherein one or more of the hydroxyl groups are replaced with halogen atoms or aliphatic groups, are functionalized as ethers, amines, or the likes.

The term "nucleic acid" and "polynucleotide" are used interchangeably herein to describe a polymer of any length, e.g., greater than about 2 bases, greater than about 10 bases, greater than about 100 bases, greater than about 500 bases, greater than 1000 bases, up to about 10,000 or more bases composed of nucleotides, e.g., deoxyribonucleotides or ribonucleotides, and may be produced enzymatically or synthetically (e.g., PNA as described in U.S. Pat. No. 5,948,902 and the references cited therein) which can hybridize with naturally occurring nucleic acids in a sequence specific manner analogous to that of two naturally occurring nucleic acids, e.g., can participate in Watson-Crick base pairing interactions. Naturally-occurring nucleotides include guanine, cytosine, adenine and thymine (G, C, A and T, respectively).

The term "nucleic acid sample," as used herein denotes a sample containing nucleic acids.

The term "target polynucleotide," as use herein, refers to a polynucleotide of interest under study. In certain embodiments, a target polynucleotide contains one or more target sites that are of interest.

The term "oligonucleotide" as used herein denotes a single stranded multimer of nucleotide of from about 2 to 500 nucleotides or more. Oligonucleotides may be synthetic or may be made enzymatically, and, in some embodiments, are 10 to 50 nucleotides in length. Oligonucleotides may contain ribonucleotide monomers (i.e., may be oligoribonucleotides) or deoxyribonucleotide monomers. An oligonucleotide may be 10 to 20, 11 to 30, 31 to 40, 41 to 50, 51-60, 61 to 70, 71 to 80, 80 to 100, 100 to 150 or 150 to 200 nucleotides, or more in length, for example.

A "biopolymer" is a polymer of one or more types of repeating units. Biopolymers are typically found in biological systems (although they may be made synthetically) and particularly include peptides, polysaccharide, or polynucleotides, as well as such compounds composed of or containing amino acid analogs or non-amino acid groups, or nucleotide analogs or non-nucleotide groups.

An "array," includes any two-dimensional or substantially two-dimensional (as well as a three-dimensional) arrangement of spatially addressable regions bearing biopolymers, particularly oligonucleotides or synthetic mimetics thereof, and the like. Where the arrays are arrays of nucleic acids, the nucleic acids may be adsorbed, physisorbed, chemisorbed, or covalently attached to the arrays at any point or points along the nucleic acid chain.

An "array," includes any two-dimensional or substantially two-dimensional (as well as a three-dimensional) arrangement of spatially addressable regions bearing nucleic acids, particularly oligonucleotides or synthetic mimetics thereof, and the like. Where the arrays are arrays of nucleic acids, the nucleic acids may be adsorbed, physisorbed, chemisorbed, or covalently attached to the arrays at any point or points along the nucleic acid chain.

Any given substrate, such as a transparent slide, may carry one, two, four or more arrays disposed on a surface of the substrate. Depending upon the use, any or all of the arrays may be the same or different from one another and each may contain multiple spots or features. An array may contain one or more, including more than two, more than ten, more than one hundred, more than one thousand, more ten thousand features, or even more than one hundred thousand features, in an area of less than 20 cm or even less than 10 $cm^2$, e.g., less than about 5 $cm^2$, including less than about 1 $cm^2$, less than about 1 $mm^2$, e.g., 100 $\mu m^2$, or even smaller. For example, features may have widths (that is, diameter, for a round spot) in the range from a 10 µm to 1.0 cm. In other embodiments each feature may have a width in the range of 1.0 µm to 1.0 mm, usually 5.0 µm to 500 µm, and more usually 10 µm to 200 µm. Non-round features may have area ranges equivalent to that of circular features with the foregoing width (diameter) ranges. At least some, or all, of the features are of different compositions (for example, when any repeats of each feature composition are excluded the remaining features may account for at least 5%, 10%, 20%, 50%, 95%, 99% or 100% of the total number of features). Inter-feature areas will typically (but not essentially) be present which do not carry any nucleic acids (or other biopolymer or chemical moiety of a type of which the features are composed). Such inter-feature areas typically will be present where the arrays are formed by processes involving drop deposition of reagents but may not be present when, for example, photolithographic array fabrication processes are used. It will be appreciated though, that the inter-feature areas, when present, could be of various sizes and configurations.

Each array may cover an area of less than 200 $cm^2$, or even less than 50 $cm^2$, 5 $cm^2$, 1 $cm^2$, 0.5 $cm^2$, or 0.1 $cm^2$. In certain embodiments, the substrate carrying the one or more arrays will be shaped generally as a rectangular solid (although other shapes are possible), having a length of more than 4 mm and less than 150 mm, usually more than 4 mm and less than 80 mm, more usually less than 20 mm; a width of more than 4 mm and less than 150 mm, usually less than 80 mm and more usually less than 20 mm; and a thickness of more than 0.01 mm and less than 5.0 mm, usually more than 0.1 mm and less than 2 mm and more usually more than 0.2 mm and less than 1.5 mm, such as more than about 0.8 mm and less than about 1.2 mm.

Figure 2:
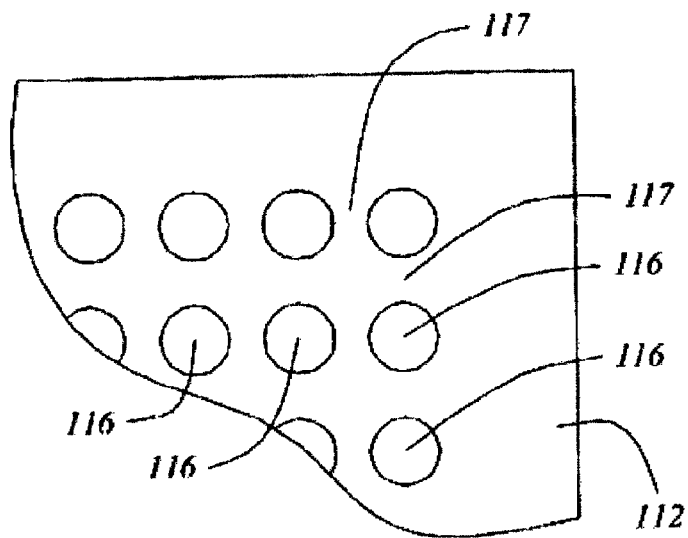
FIG. 2 is an enlarged view of a portion of FIG. 1 showing spots or features of the array.
Figure 3:
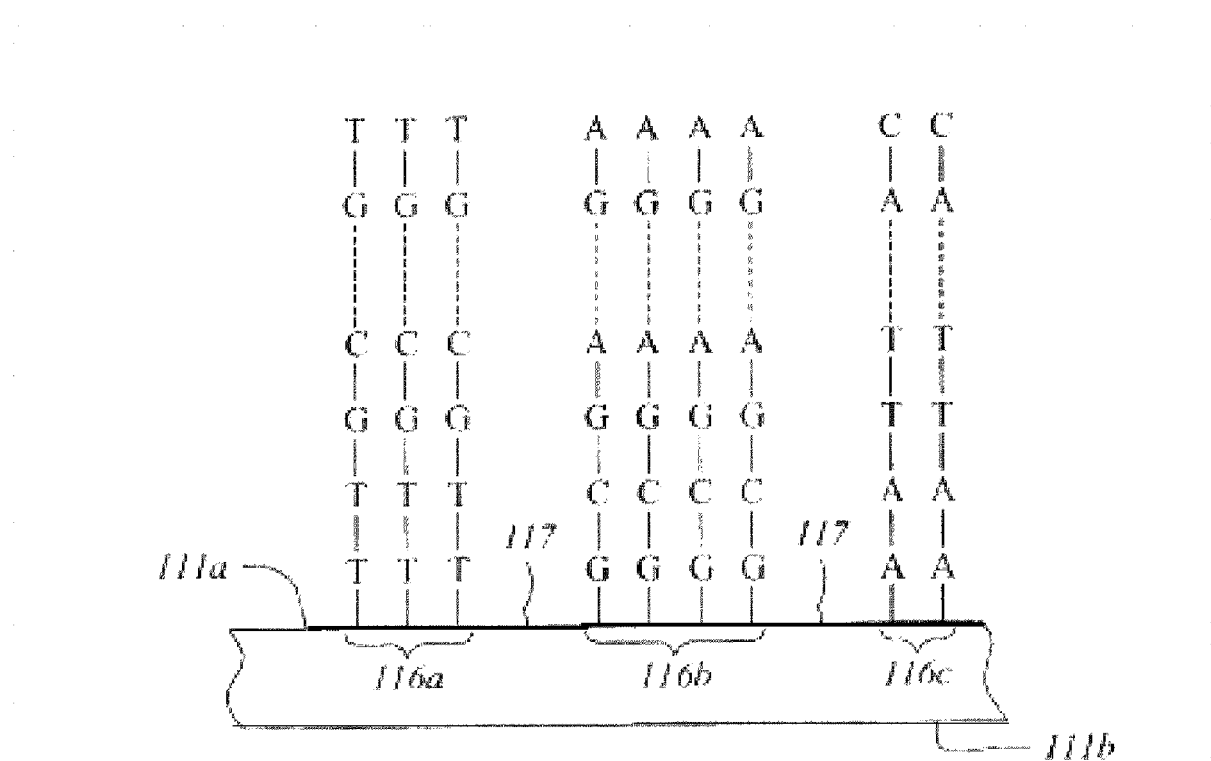
FIG. 3 is an illustration of exemplary polynucleotides present in certain features of the array of FIG. 2.

An exemplary slide carrying a chemical array is shown in FIG. 1. FIG. 1 depicts a contiguous planar transparent slide 110 carrying an array 112 disposed on a rear surface 111*b* of substrate 110. The above mentioned spots or features of the array are depicted in FIG. 2. FIG. 3 is an illustration of exemplary polynucleotides present in certain features of the array of FIG. 2.

Arrays can be fabricated using drop deposition from pulsejets of either precursor units (such as nucleotide or amino acid monomers) in the case of in situ fabrication, or the previously obtained nucleic acid. Such methods are described in detail in, for example, U.S. Pat. No. 6,242,266, U.S. Pat. No. 6,232, 072, U.S. Pat. No. 6,180,351, U.S. Pat. No. 6,171,797, U.S. Pat. No. 6,323,043, U.S. patent application Ser. No. 09/302, 898 filed Apr. 30, 1999 by Caren et al., and the references cited therein. These references are incorporated herein by reference. Other drop deposition methods can be used for fabrication, as previously described herein. Also, instead of drop deposition methods, photolithographic array fabrication methods may be used. Inter-feature areas need not be present particularly when the arrays are made by photolithographic methods as described in those patents.

An array is "addressable" when it has multiple regions of different moieties (e.g., different oligonucleotide sequences) such that a region (i.e., a "feature" or "spot" of the array) at a particular predetermined location (i.e., an "address") on the array contains a particular sequence. Array features are typically, but need not be, separated by intervening spaces.

The phrase "seal" refers to a seal that restricts passage of air through the seal. A seal may or may not completely prevent passage of air through the seal. A reversible seal is formed by application of pressure and is broken or reversed by ceasing application of pressure.

The term "substantially" as used herein refers to at least 70%, 80%, 90%, 99%, or 100%. For example, the phrase "substantially planar area" refers to an area that is at least 70%, 80%, 90%, 99%, or 100% planar.

The term "flange" as used herein refers to a rim or edge, one side of which is contiguous with or attached to the bottom part of a sealing element of the slide cover. The flange may be continuous around periphery of the sealing element or it may be discontinuous.

The phrase "active region" refers to an area on a slide which area contains the biopolymer array.

The phrase "optically inert" refers to a characteristic of a material such that the material does not emit and/or reflect light. An opaque material, a black material, a non-fluorescent material are examples of optically inert materials. An optically inert material contributes less than 20%, less than 10%, less than 5%, less than 1%, or less than 0.5% to the strongest signal which can be obtained from a feature in the active region of the slide.

It will be appreciated that throughout the present application, the words such as "front", "back", "rear", "bottom", "top", "upper", "lower", "leading", "trailing", "upward", "downward", are all used in a relative sense only.

DETAILED DESCRIPTION OF EXEMPLARY EMBODIMENTS

A slide cover is provided. In certain cases, the subject slide cover comprises a top surface comprising a first raised area for applying pressure to said slide cover, and a bottom surface comprising (a) a substantially planar area; and (b) a sealing element, wherein said slide cover is adapted to engage with a slide comprising an active region to produce a cavity defined by said substantially planar area, said sealing element and a region of said slide that comprises the active region, wherein pressure upon said first raised area pushes said sealing element upon said slide to form a reversible seal that encloses said active region of said slide and forms a barrier to air circulation between the interior and exterior of said cavity.

Before the present subject invention is described further, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range is encompassed within the invention.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are now described. All publications mentioned herein are incorporated herein by reference to disclose and describe the methods and/or materials in connection with which the publications are cited.

It must be noted that as used herein and in the appended claims, the singular forms "a", "an", and "the" include plural referents unless the context clearly dictates otherwise. Thus, for example, reference to "an array" includes a plurality of arrays and reference to "an active region" includes reference to one or more active regions and equivalents thereof known to those skilled in the art, and so forth. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates which may need to be independently confirmed.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

As mentioned above, a slide cover is provided. In certain embodiments, the slide cover may be a substantially flat device with a top and a bottom surface. The top surface may include a raised area which rises above the plane of the top surface. The bottom surface may include a substantially planar area and a sealing element. The sealing element may have a defined height. The slide cover is shaped and dimensioned to cover a region comprising an active region on a slide. When the slide cover is placed on a slide comprising an active region, a cavity is defined by the substantially planar area, the sealing element, and the region of the slide at which the slide cover is placed. Application of pressure on the raised area pushes the sealing element upon the slide forming a reversible seal between the sealing element and surface of the slide. The reversible seal forms a barrier to air circulation between the interior and exterior of the cavity limiting the exposure of the active region of the slide to molecules in the atmosphere. The seal may limit air circulation between the interior and exterior of the cavity rather than completely prevent air circulation.

In certain embodiments, the raised area is used for applying pressure to the slide cover. The raised area present on the top surface of the slide cover may take any shape, such as, a bump, a finger-like protrusion, a dome, etc. In certain examples, the raised area may be shaped as a hemisphere, a plateau with sloping walls, a pyramid, or a cone, for example, or any other three-dimensional shape. Other shapes of the raised area although not specifically mentioned herein are encompassed by the subject description. Thus, viewed from the side (i.e., along the z-axis if the plane is defined by x- and y-axis), the raised area may look like a circle, a semicircle, a square, a rectangle, a rhombus, an oval, a semi-oval, a triangle, etc.

The raised area covers no more than 1%-20% of the area of the top surface of the slide cover. In certain embodiments, raised area covers no more than 5%-15%, or 5%-10% of the area of the top surface of the slide cover. The height of the raised area (as measured from the plane of the top surface) may be in the range of 0.1 mm to 5 mm. In certain embodiments, height of the raised area may be in the range of 0.5 mm to 3 mm, while in other cases, height of the raised area may be 1 mm to 3 mm. In certain embodiments the width (or diameter) of the raised area (viewed from above) may be in the range of 0.5 mm to 10 mm, or 1 mm to 5 mm, while in other cases, width of the raised area may be 1 mm to 3 mm.

In some cases, the raised area is positioned closer to the periphery of the slide cover than the center. In some embodiments, the raised area may be positioned at the middle of the slide. In embodiments in which more than one raised area is present, the raised areas may be at the periphery of the slide. In exemplary embodiments, the raised area is not positioned at a region on the top surface, which corresponds to the substantially planar surface of the bottom region which defines the above mentioned cavity. This ensures that when pressure is applied to the raised region, any possible bending or flexing of the slide cover does not reduce the distance between the active region and the substantially planar area of the bottom surface of the slide cover in the cavity to such an extent that the substantially planar area would be in the depth of focus of the scanning means used to scan the active region of the slide. In other words, in certain embodiments, the height of the cavity is not substantially affected when pressure is applied to the raised area. In certain embodiments, the reduction on the height of the cavity is less than 20%, or less than 10%, or lesser. As noted above, this may be achieved by placing the raised area(s) near the periphery of the part of the slide cover that defines the cavity. In other embodiments, this is achieved by manufacturing the slide cover from a material which does not substantially flex upon application of pressure. Materials suitable for this application are readily apparent to one of ordinary skill in the art and may further be determined empirically, for example, by testing the flexion of different materials upon application of pressure. In certain embodiments, the slide cover may be prevented from substantially flexing into the cavity by making a thicker slide cover.

In certain examples, the top surface of the subject slide cover may include a plurality of raised areas. The plurality of raised areas may be placed on the top surface in a number of configurations. For example, when two raised areas are present, the distance separating the two raised areas may be the same as the distance of each raised area from the periphery of the slide cover. In some cases, the raised areas may be positioned in a manner that provides for even distribution of pressure over the slide cover. In other cases, the raised areas are placed evenly, such as, two towards one end and two towards the opposite end of the slide cover.

The slide cover may be shaped in a number of geometric shapes, such as, circular, rectangular, etc. In certain examples, the shape and size of the slide cover is chosen to match those of the slide or those of the active region on the slide. In certain embodiments, the slide cover is rectangular. The rectangular slide cover may have a width the range of 0.8 inch to 1.2 inch and a length in the range of 2.5 inch to 3.2 inch. In certain cases, the rectangular slide cover may have a width the range of 0.9 inch to 1 inch and a length in the range of 2.8 inch to 3 inch. In exemplary embodiments, the rectangular slide cover may have a width of about 0.9 inch and a length of about 2.9 inch. The term "about" or "in the range of" as used herein refers to a difference of no more than 0.1%, no more than 0.5%, no more than 1%, no more than 2% or more, no more than 5%, or no more than 10% from the specified value. In particular embodiments, the rectangular slide cover may have a width of 1 inch and a length of 3 inch. The cross-sectional thickness of the slide cover may be the same throughout or may vary at defined regions. For example, the cross-sectional thickness of the slide cover may be in the range of 0.05 mm to 1 mm throughout.

In some cases, the bottom surface of the slide cover includes a substantially planar area and a sealing element. In certain embodiments the sealing element is located at the periphery of the slide cover, while in other cases the sealing element is placed close to the periphery of the slide cover. In certain cases, the sealing element is an extension of the bottom surface of the slide cover. In other examples, the sealing element is a separate piece that has been attached to the bottom surface of the slide cover. In certain embodiments, the sealing element is a wall that extends out from the bottom surface of the slide cover. The height of the sealing element (in the plane perpendicular to the plane of the bottom surface) is chosen based on how far the bottom surface of the slide cover is to be placed from the active region of the slide. The distance of the bottom surface of the slide cover from the active region of the slide is chosen based on the depth-of-field of the optical system used to scan the active region. In other words, the bottom surface of the slide cover is not in the depth-of-field of the optical system and hence does not interfere with the scanning of the optical system. In certain embodiments, the height of the sealing element is in the range of 0.5 mm-5 mm, for example, in the range of 1 mm-4 mm, or 1 mm-3 mm. In certain embodiments, the height of the sealing element may be reduced due to compression of the sealing element upon application of pressure on the raised area of the slide cover. In certain cases, the sealing element does not compress upon application of pressure. The height of the sealing element may be adjusted empirically depending on the depth-of-field of, for example, the objective lens used to scan the array, the compression of the sealing element upon application of pressure, etc.

The sealing element may further comprise a flange. The flange may be an extension of the sealing element. For example, in embodiments where the sealing element is a wall that extends out from the bottom surface of the slide cover, the flange may further extend the sealing element in a direction perpendicular to the wall. In other words, the flange increases the width of the sealing element at the region of contact of the sealing element with the slide. The flange may be continuous or discontinuous. In certain cases, the flange may be discontinuous to provide elements from a slide holder to come ion contact with the slide. In embodiments where the sealing element is a wall that extends out from the bottom surface of the slide cover and contacts the slide close to the periphery of the slide, the flange extends to the periphery of the slide. Thus, the flange may aid in positioning the slide cover over the slide. In other embodiments, the sealing element may comprise the flange as described above which may further be extended to form a member that fits around the periphery of the slide. This member extending from the flange may be present discontinuously. In certain embodiments, this member is present on only one end of the slide cover.

Figure 4A:
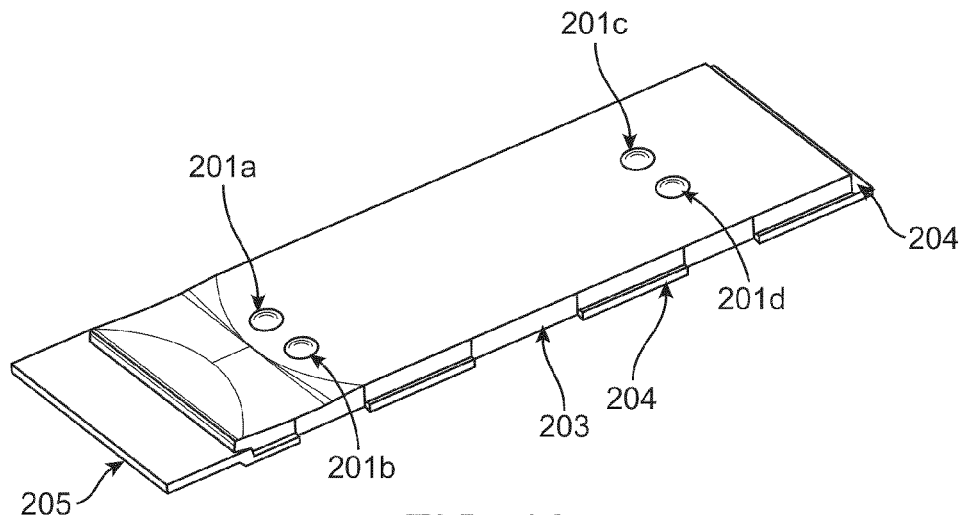
FIG. 4A is the top view of a slide cover.
Figure 4B:
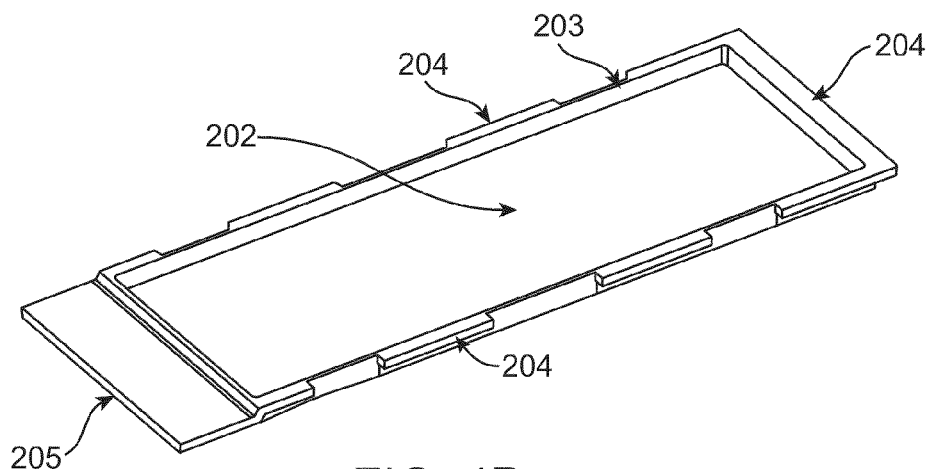
FIG. 4B is the bottom view of the slide cover.

An exemplary slide cover 208 is illustrated in FIGS. 4A and 4B. FIG. 4A shows the top view of the slide cover. The top surface of the slide cover is shown with four raised areas 201a-201d for applying pressure to the slide cover. FIG. 4B shows the bottom view of the slide cover. The bottom surface of the slide cover comprises a substantially planar area 202 and a sealing element 203. The sealing element 203 is shown as a wall that extends from the bottom surface of the slide. The sealing element 203 is shown with a discontinuous flange 204 extending out from the bottom region of the sealing element. The flange 204 in this figure is discontinuous to allow elements (such as spring fingers, described below) in the lid of a slide holder to contact the slide. Also shown is the optional locating tab 205 which is used to hold and position the slide cover over a slide.

Figure 5:
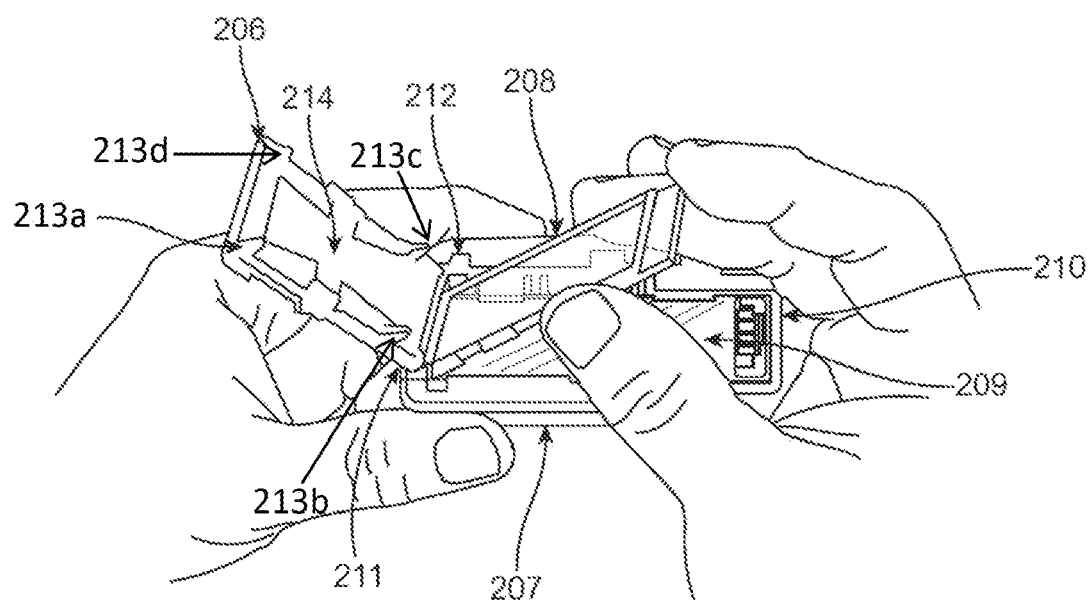
FIG. 5 shows placement of a slide cover on a slide in a clamshell slide holder.

FIG. 5 shows the placement of a slide cover 208 onto a slide 209 placed in a clamshell slide holder 210. Clamshell slide holder 210 comprises a contiguous base 207 and a lid 206 attached to the base 207. The lid 206 may be attached to the base 207 using a hinge 211 and a joint 212. The bottom surface 214 of the lid 206 may be used for applying pressure upon raised areas 201a-201d (see FIG. 4) of slide 208 to push the sealing element 203 (see FIG. 4) upon slide 209 to form a reversible seal that encloses the active region (e.g. array) of the slide 209 and forms a barrier to air circulation over the active region. The spring fingers 213a-213d each engage the rear surface (carrying the active region) of slide 209. The active region faces toward the lid 206, slide cover 208 and spring fingers. Each spring finger engages the slide 209 which is sandwiched between each spring finger and associated slide support(s) (not shown). The spring fingers 213a-213d comprise a portion of the lid 206 and are designed for securely immobilizing the slide in the slide holder. The clamshell slide holder in which the subject slide cover may be used is described in detail in US Application Publication No. 2004/0223890, which is hereby incorporated by reference. The slide 209 is a planar transparent slide and the array present on the rear surface of the slide (i.e., inside the slide holder) is scanned through the front surface of the slide.

The slide cover is used to enclose an active area, such as an array, on a slide. Referring first to FIGS. 1-3, typically methods and devices disclosed herein use a contiguous planar transparent slide 110 carrying an array 112 disposed on a rear surface 111b of substrate 110. It will be appreciated though, that more than one array (any of which are the same or different) may be present on rear surface 111b, with or without spacing between such arrays. In certain embodiments, one or more arrays 112 may cover the entire rear surface 111b, with regions of the rear surface 111b adjacent to the opposed sides 113c, 113d and leading end 113a and trailing end 113b of slide 110. A front surface 111a of the slide 110 does not carry any arrays 112. Each array 112 can be designed for testing against any type of sample, whether a trial sample, reference sample, a combination of them, or a known mixture of polynucleotides (in which latter case the arrays may be composed of features carrying unknown sequences to be evaluated). Slide 110 may be of any shape, and any slide holder used with it and subject slide cover adapted accordingly, although slide 110 will typically be rectangular in practice. Array 112 contains multiple spots or features 116 of biopolymers in the form of polynucleotides. A typical array may contain from more than ten, more than one hundred, more than one thousand or ten thousand features, or even more than from one hundred thousand features. All of the features 116 may be different, or some or all could be the same. In the case where array 112 is formed by the conventional in situ or deposition of previously obtained moieties, as described above, by depositing for each feature at least one droplet of reagent such as by using a pulse jet such as an inkjet type head, interfeature areas 117 will typically be present which do not carry any polynucleotide. It will be appreciated though, that the interfeature areas 117 could be of various sizes and configurations. Each feature carries a predetermined polynucleotide (which includes the possibility of mixtures of polynucleotides). A, C, G, T represent the usual nucleotides. It will be understood that there may be a linker molecule (not shown) of any known types between the rear surface 111b and the first nucleotide. However, as mentioned above, the array 112 may optionally be on the front surface 111a.

Slide 110 may also carry on front surface 111a, an identification code, for example, a bar code printed on an opaque substrate in the form of a paper label attached by adhesive to front side 111a. The identification code may be attached to either the trailing end or the leading end of the slide. In certain embodiments, the identification code printed on an opaque substrate in the form of a paper label may be attached by adhesive to rear side 111b at either the trailing end or the leading end of the slide. By "opaque" in this context is referenced that the means used to read bar code 115 (typically a laser beam) cannot read code 115 through the label without reading errors. Typically this means that less than 60% or even less than 50%, 30%, 20% or 10% of the signal from the code passes through the substrate. Bar code 115 contains an identification of array 112 and either contains or is associated with, array layout information in a manner such as described in U.S. patent application Ser. No. 09/302,898 (filed Apr. 30, 1999) and Ser. No. 09/359,536 (filed Jul. 22, 1999; now issued as U.S. Pat. No. 6,180,351, Jan. 30, 2001) both originally assigned to Hewlett-Packard, incorporated herein by reference. In certain cases, the identification code printed on an opaque substrate in the form of a paper label may be attached by adhesive to rear side 111b and also to the front side 111a. In these embodiments, the identification code may be read from either side of the slide. In these embodiments, there is usually a distinguishing feature accompanying the identification code which distinguishing feature allows the user to distinguish the side carrying the active region (i.e., the active side of the slide) from the side not carrying the active region (i.e., the inactive side of the slide). Thus, in certain embodiments, a numeric barcode is placed on the inactive slide and an "Agilent"-labeled barcode is placed on the active side.

For the purposes of the discussions below, it will be assumed (unless the contrary is indicated) that the array 112 is a polynucleotide array formed by the deposition of previously obtained polynucleotides using pulse jet deposition units. However, it will be appreciated that an array of other polymers or chemical moieties generally, whether formed by multiple cycle in situ methods adding one or more monomers per cycle, or deposition of previously obtained moieties, or by other methods, may be present instead.

Preferred slide materials provide physical support for the deposited material and endure the conditions of the deposition process and of any subsequent treatment or handling or processing that may be encountered in the use of the particular array. The array substrate may take any of a variety of configurations ranging from simple to complex. In many embodiments, the slide will be shaped generally as a rectangular solid, having a width the range of 0.8 inch to 1.2 inch and a length in the range of 2.5 inch to 3.2 inch. In certain cases, the rectangular slide may have a width the range of 0.9 inch to 1 inch and a length in the range of 2.8 inch to 3 inch. In exemplary embodiments, the rectangular slide may have a width of about 0.9 inch and a length of about 2.9 inch. In particular embodiments, the rectangular slide may have a width of 0.98 inch and a length of 3 inch.

In embodiments where the active region comprises an array, any of a variety of geometries of arrays 112 on a slide 110 may be used, when multiple arrays 112 are present. For example, such arrays can be arranged in a sequence of curvilinear rows across the substrate surface (for example, a sequence of concentric circles or semi-circles of spots), and the like. Similarly, the pattern of features 116 may be varied from the rectilinear rows and columns of spots in FIG. 2 to include, for example, a sequence of curvilinear rows across the substrate surface (for example, a sequence of concentric circles or semi-circles of spots), and the like. The configuration of the arrays and their features may be selected according to manufacturing, handling, and use considerations.

The slide is may be transparent. In this context, the term "transparent" refers to permitting any interrogating radiation to pass therethrough without substantial attenuation and also permitting the signal from features to pass therethrough without substantial attenuation or distortion. By "without substantial attenuation" may include, for example, without a loss of more than 40%, more than 30%, more than 20% or more than 10%. The interrogating radiation and signal may for example be visible, ultraviolet or infrared light. In general, the materials from which the substrate may be fabricated should ideally exhibit a low level of non-specific binding during hybridization events. Suitable rigid substrates may include: glass (which term is used to include silica) and suitable plastics.

The substrate surface on which the active region is present may be smooth or substantially planar, or have irregularities, such as depressions or elevations. The surface may be modified with one or more different layers of compounds that serve to modify the properties of the surface in a desirable manner. Such modification layers, when present, will generally range in thickness from a monomolecular thickness to about 1 mm, usually from a monomolecular thickness to about 0.1 mm and more usually from a monomolecular thickness to about 0.001 mm. Modification layers of interest include: inorganic and organic layers such as metals, metal oxides, polymers, small organic molecules and the like. Polymeric layers of interest include layers of: peptides, proteins, polynucleic acids or mimetics thereof (for example, peptide nucleic acids and the like); polysaccharides, phospholipids, polyurethanes; polyesters, polycarbonates, polyureas, polyamides, polyethyleneamines, polyarylene sulfides, polysiloxanes, polyimides, polyacetates, and the like, where the polymers may be hetero- or homopolymeric, and may or may not have separate functional moieties attached thereto (for example, conjugated).

In certain cases, the subject slide cover further comprises a slide comprising an active region, wherein the slide cover is engaged with the slide to produce a cavity defined by the substantially planar area, the sealing element and a region of the slide that comprises the active region, wherein pressure upon the raised area pushes the sealing element upon the slide to form a reversible seal that encloses the active region of the slide and forms a barrier to air circulation between the interior and exterior of the cavity.

In certain embodiments, a clamshell holder comprising a base for mounting and holding a slide, the slide comprising an active region; a lid mounted on the base for closing the clamshell slide holder and securing the slide in a fixed position; and a slide cover comprising a top surface comprising a first raised area for applying pressure to the slide cover; and a bottom surface comprising a substantially planar area; and a sealing element is provided. As described above, the slide cover is adapted to engage with said slide to produce a cavity defined by the substantially planar area, the sealing element and a region of the slide that comprises the active region, wherein pressure upon the first raised area pushes the sealing element upon the slide to form a reversible seal that encloses the active region of the slide and forms a barrier to air circulation between the interior and exterior of the cavity. In some cases, slide cover is attached to the lid of the clamshell holder while in other examples, the slide cover is a separate piece that is not attached to the lid of the clamshell holder. In certain cases, the base and lid are joined at one end by a hinge, and closure of the lid exerts pressure upon the first raised area, thereby forming the reversible seal. In embodiments where the slide is placed in a clamshell holder, the active region of the slide faces the lid of the clamshell holder and may be scanned through the slide.

In certain cases, the slide cover for subject clamshell slide holder may be designed to fit in the space between the rear surface of the slide (at which the active area is present) and the bottom surface of the lid of the clamshell holder. The above mentioned sealing element determines the height of the cavity, i.e., the spacing between the active region and the substantially planar region of the bottom surface of the slide. As noted above, the substantially planar region of the bottom surface of the slide cover is spaced from the active region such that the bottom surface is removed from the depth-of-field of the objective lens of the means for scanning the active region. The spacing between the active region and the substantially planar region of the bottom surface of the slide may be in the range of 0.5 mm to 10 mm, for example, in the range of 0.5 mm to 5 mm, or 1 mm to 3 mm. The sealing element may be spaced at a distance in the range of 1 mm to 5 mm from the periphery of the active region, for example, in the range of 2 mm to 3 mm.

In certain embodiments, the substantially planar area of the bottom surface of the slide cover is optically inert. In certain embodiments, the sealing element is optically inert. In yet other embodiments, the entire slide cover is optically inert.

In certain embodiments, the slide cover is made of a transparent material. In other embodiments, the slide cover is made from an opaque plastic. In some cases, the slide cover is made from black plastic. In cases where a black or opaque slide cover is used, an identification code printed on an opaque substrate in the form of a paper label may be attached by adhesive to front side 111a of the slide. Since the identification code would be read from the front side of the slide, the use of a black or opaque slide cover on the rear side of the slide would not interfere with the reading of the identification code.

In certain cases, the slide cover is made from a moldable plastic. A number of suitable plastics and other materials may be used to manufacture the slide cover. In certain cases, the slide cover is made from a thermoplastic material. In certain cases, the slide cover is made from a thermosetting plastic material. In certain cases, the slide cover is made of a plastic material selected from a group consisting of polypropylene, polystyrene, polyvinyl chloride, acrylonitrile butadiene styrene, styrene butadiene copolymers, and polyethylene terephthalate. The suitability of a material for use in making the subject slide cover is readily apparent to the ordinary skilled artisan or may be determined empirically. In certain embodiments, a material which yields a slide cover that is shatter-resistance is used. In certain embodiments, the slide cover is not made from elastomeric material and the slide cover is not elastomeric. In certain embodiments, the slide cover is not substantially deformable. In certain embodiments, the slide cover is impact resistant. In certain cases the slide cover is made from styrene butadiene block copolymer, Styrolux® 3G33 (BASF). In other cases, plastic materials with a tensile modulus similar to that of Styrolux® 3G33 (i.e., a tensile modulus is that different from the tensile modulus of Styrolux® 3G33 by less than 1%, 2%, 5%, 10%, or 20%) may be used to manufacture the slide cover.

In certain embodiments, the sealing element of the slide cover may be elastomeric while in other embodiments, the sealing element of the slide cover may not be elastomeric. The term "elastomeric" as used herein means that the material (used to make the sealing element) is relatively soft (Young's Modulus (E) of about 3 MPA) and deformable at ambient temperature (i.e., a temperature of about 7° C. (44° F.) to 32° C. (90° F.)). In certain embodiments, elastomers that regain their original shape, i.e., are not permanently deformed are used. In other embodiments, elastomers that do not regain their shape, i.e., are permanently deformed are used. In some cases, the subject slide cover is a single use slide cover and the sealing element comprises an elastomeric material that is permanently deformed upon application of pressure to the raised area of the slide cover. In embodiments where the sealing element is elastomeric, the elastomeric material may be natural rubber. In other embodiments, the sealing element may be made of a material selected from a group consisting of polyisoprene, polybutadiene, polysiloxane, styrene butadiene, polyurethane, hydrogenated nitrile butadiene, epichlorohydrin and ethylene propylene diene.

The slide cover may be manufactured as a single piece of plastic by a number of methods, including injection molding, vacuum forming, etc. In certain embodiments, the slide cover may have a "two-piece" design. In these embodiments, a first part of the slide cover, for example, a substantially planar part of the slide cover may first be manufactured and a second part of the slide cover, for example, the sealing element may then be added on to the first part. A "two-piece" design slide cover may be manufactured by a number of methods, such as, "two-shot" injection molding, multi-component molding, etc. For example, in a "two-shot" injection molding method, a first part of the slide cover, for example, a substantially planar part of the slide cover may first be molded from a plastic material and a second part of the slide cover, for example, the sealing element may then be formed by injecting an elastomeric material into the mold. These methods as well as other methods for manufacturing the slide cover are readily apparent to one of ordinary skill in the art.

As would be apparent to one of skill in the art, the extent of reduction in the circulation of air into the interior of the above mentioned cavity from outside upon the formation of the reversible seal depends on a number of factors. These factors include but are not limited to the strength or amount of pressure applied on the raised area(s), the material used to make the slide cover, the material used to make the sealing element (for example, in cases where the material used to make the sealing element is different from the slide cover), whether sealants, such as, silicone, polyurethane, etc., are used. In certain embodiments, sealants are not included in the reversible seal. In other embodiments, adhesives are included in the reversible seal.

In certain embodiments, the reversible seal reduces the circulation of air into the interior of the cavity by about 30%, 50%, 70%, 80%, 90%, 95%, 99%, or more, as compared to when the slide cover is not used. In certain embodiments, the amount of ozone present in the cavity is reduced by 30%, 50%, 70%, 80%, 90%, or more, as compared to when the slide cover is not used. In exemplary cases, the ozone mediated damage (e.g., degradation of a fluorophore present in the active region) may be reduced by 5%, 10%, 20%, 30%, 50%, 70%, or more, as compared to when the slide cover is not used.

In some embodiments, the clamshell slide holder 10 may be made from an opaque plastic, such as black ABS plastic (although other materials could be used). The color of clamshell slide holder is may be black to minimize any fluorescent noise or signal contribution from the clamshell slide holder. Also, the clamshell slide holder being opaque prevents any interrogating light from being scattered around inside the scanner. As noted above, in certain embodiments, the slide cover is transparent.

A feature of some embodiments of the subject slide cover is that the slide cover encloses and protects the active region of the slide from deleterious reactive species in the environment to which they would otherwise be exposed. In other words, the subject slide cover encloses the active area and may reduce the exposure of the active region to small molecules or contaminants that would otherwise chemically react or physically alter the chemical array or the fluorescent dye bound there to, negatively impacting processing and/or data analysis. Deleterious vapors and gases and the like that may be excluded by the subject slide cover comprise, but are not limited to: water, inorganic chloride, hydrogen fluoride, active sulfur compounds, nitrogen oxides, ammonia, OH free radicals, organic acids, carbon dioxide and hydrogen sulfide and ozone. In certain embodiments, the active region of the slide comprises a chemical array with a fluorescent dye bound thereto and the reversible causal seal formed by applying pressure on the raised area of the slide cover limits exposure of the array to ozone. Since ozone decays rapidly any ozone present in the cavity degrades while influx of ozone form outside into the cavity is reduced, thereby minimizing the damage to the fluorescent dyes, such as, red dye, e.g., CY-5, and other dyes of matching wavelengths.

As noted above, the slide comprising an active region may be a transparent slide having opposed front and rear surfaces. In certain embodiments, the active region present on the rear side of the slide may be scanned through the front side of the slide. The scanning, for example, may include directing a light beam through the slide from the front side and onto the active region on the rear side, and detecting a resulting signal that has passed from the rear side through the slide and out the front side. Thus, in this embodiment the active region is read from the front side through the slide and not from the rear side. In certain embodiments, when the active region is read through the front surface, the identification code may be read from the front side.

Various further modifications to the particular embodiments described above are, of course, possible. Accordingly, the present invention is not limited to the particular embodiments described in detail above.

Method of Using the Slide Cover

The slide cover may be used in the manner described below. First, the array will have typically been previously exposed to a sample that is to be analyzed for molecules (such as polynucleotides) that may bind (for example, hybridize) to the moieties (such as polynucleotides) at one or more features present in the active region of the slide. The moieties to be analyzed may be labeled with fluorescent dye(s). Any of the numerous fluorescent dyes as well as known methods for labeling moieties may be used. The active region may then be washed and dried in preparation for scanning. At this point a user will typically grip opposing portions of the front and rear surfaces of the slide toward the end carrying the identification code using his/her thumb and forefinger and insert the slide into the base of a slide holder 210 (See FIG. 5). In general, the end of the slide without the identification code is placed on the rear ledge of the base of the slide holder and the slide is gently dropped into the base of the slide holder. The surface of the slide carrying the active region (i.e., the rear side) faces up toward the user and away from the base of the slide holder. Thus, in case of slides from Agilent Inc., the active side of the slide is the side marked with "Agilent"-labeled barcode while the numeric barcode marks the inactive side of the slide. In this case, the active side of the slide bearing the "Agilent"-labeled barcode faces lid of the clamshell slide holder.

The slide cover is placed over the rear surface of the slide carrying the active region. The bottom surface of the slide cover comprising the sealing element faces the active region of the slide such that upon placement of the slide cover on the slide (see FIG. 5), the sealing element is in contact with the rear surface of the slide. The lid of the clamshell slide holder is closed, thereby exerting pressure on the raised area and pushing the sealing element upon the slide and forming a cavity defined by the substantially planar surface of the bottom surface of the slide cover, the sealing element and the region of the slide cover comprising the active region, as described above. In general, powder-free gloves are used while handling the slide and the slide cover.

The clamshell slide holder 210 with the enclosed and protected slide may then be inserted into a reader, such as a laser scanner, which has a suitable mounting means for receiving and releasably retaining the holder in a known position. The scanner should be able to read the location and intensity of fluorescence at each feature of an array following exposure to a fluorescently labeled sample (such as a polynucleotide containing sample). For example, such a scanner may be similar to the GENEARRAY scanner available from Agilent Technologies, Inc. The array 112 may then be read through front side 110*a* of slide 110. In particular, a scanning interrogating laser beam may be directed through a beam splitter and then through front side 110*a* and scanned across array 112. Resulting fluorescent signals from the array that have passed back through slide 110 and out through front side 110*a* may then be detected at detector. Results from the interrogation can be processed such as by rejecting a reading for a feature which is below a predetermined threshold and/or forming conclusions based on the pattern read from the array (such as whether or not a particular target sequence may have been present in the sample). The results of the interrogation or processing can be forwarded (such as by communication) to a remote location if desired, for further use. The bar code 210 is read from the front side of slide 209 by a bar code reader. Information from the read bar code 210 can be used to retrieve array layout information which can be used in the reading and/or processing of the interrogation results, in a manner as described in U.S. patent application Ser. No. 09/302,898 (filed Apr. 30, 1999) and Ser. No. 09/359,536 (filed Jul. 22, 1999; now issued as U.S. Pat. No. 6,180,351, Jan. 30, 2001) both originally assigned to Hewlett-Packard, incorporated herein by reference. The data obtained from the above scanning may be saved onto a recording device such as CD, DVD, hard drive, permanent memory and optionally printed or displayed on a computer monitor to a user.

After the reading of the array, the clamshell holder may be removed from the scanner. A user may now store the slide within the clamshell holder for rescanning at a later date or remove the slide cover for discarding or reusing. For removing the slide cover, the user opens the lid of the slide cover by pressing down on the lid and sliding the lid away from the hinge area. This motion opens the lid which then is lifted up at the unhinged region. Holding the lid open, the user may lift the slide cover out on one end by first using a finger nail and then gripping the locating tab of the slide cover.

UTILITY

The devices described herein are used to enclose and protect active region on a slide. For example, the slide cover in combination with the clamshell slide holder may be used to enclose a chemical array, such as a polynucleotide array, a polypeptide array, etc. and limit their exposure to atmospheric molecules such as ozone.

The slide cover may be designed for use inside an existing slide holder to limit exposure of the slide placed in the slide holder to atmospheric molecules.

The slide cover may be for a single use or multiple use.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

What is claimed is:

1. A slide cover comprising:
 a top surface comprising a first raised area for applying pressure to said slide cover, and
 a bottom surface comprising:
  (a) a substantially planar area; and
  (b) a sealing element;
 wherein said slide cover is adapted to engage with a rear surface of a slide comprising an active region on said rear surface to produce a cavity defined by said substantially planar area, said sealing element and said rear surface of said slide that comprises the active region,
 wherein pressure upon said first raised area pushes said sealing element upon said rear surface of said slide to form a reversible seal that encloses said active region of said slide and forms a barrier to air circulation between the interior and exterior of said cavity.

2. The slide cover of claim 1, wherein said substantially planar area of said bottom surface is optically inert and is spaced from said active region of said slide in said cavity.

3. The slide cover of claim 1, wherein the sealing element comprises a wall which is about 1-3 mm in height.

4. The slide cover of claim 1, wherein said sealing element is located at the periphery of said slide cover and comprises a flange that contacts said slide.

5. The slide cover of claim 4, wherein said flange is discontinuous to allow elements from a slide holder to contact said slide.

6. The slide cover of claim 4, wherein said flange extends to the periphery of said slide.

7. The slide cover of claim 1, wherein said slide cover is an injection molded single piece of plastic.

8. The slide cover of claim 1, wherein said slide cover is made of a plastic material selected from a group consisting of polypropylene, polystyrene, polyvinyl chloride, acrylonitrile butadiene styrene, styrene butadiene copolymers, and polyethylene terephthalate.

9. The slide cover of claim 1, wherein said reversible seal does not comprise an adhesive.

10. The slide cover of claim 1, wherein said top surface comprises a second, a third and a fourth raised area, wherein said first, second, third, and fourth raised area are positioned closer to periphery of the slide cover than center of the slide cover.

11. The slide cover of claim 1, wherein the slide cover has the same dimensions as said slide.

12. The slide cover of claim 1, wherein said slide cover comprises a locating tab for holding said slide cover and positioning said slide cover over said slide.

13. The slide cover of claim 1, wherein said active region comprises a chemical array with fluorescent dye bound thereto and said reversible seal protects said fluorescent dye from ozone-mediated degradation.

14. A clamshell holder comprising:
 (a) a base for mounting and holding a slide, said slide comprising an active region on a rear surface of a slide;
 (b) a lid mounted on the base for closing the clamshell slide holder and securing the slide in a fixed position; and
 (c) a slide cover comprising:
  a top surface comprising a first raised area for applying pressure to said slide cover; and
  a bottom surface comprising:
   (i) a substantially planar area; and
   (ii) a sealing element;
 wherein said slide cover is adapted to engage with said rear surface of said slide to produce a cavity defined by said substantially planar area, said sealing element and said rear surface of said slide that comprises said active region, wherein pressure upon said first raised area pushes said sealing element upon said rear surface of said slide to form a reversible seal that encloses said active region of said slide and forms a barrier to air circulation between the interior and exterior of said cavity.

15. The clamshell holder of claim 14, wherein said slide cover is attached to said lid.

16. The clamshell holder of claim 14, wherein said slide cover is a separate piece that is not attached to said lid.

17. The clamshell holder of claim 14, wherein said base and lid are joined at one end by a hinge, and closure of said lid exerts pressure upon said first raised area, thereby forming said reversible seal, wherein said first raised area is present closer to periphery of said slide cover than center of said slide cover.

* * * * *